United States Patent
Yang et al.

(10) Patent No.: US 11,477,751 B2
(45) Date of Patent: Oct. 18, 2022

(54) COMMUNICATION METHOD, TERMINAL DEVICE AND MEDIUM

(71) Applicant: GUANGDONG OPPO MOBILE TELECOMMUNICATIONS CORP., LTD., Dongguan (CN)

(72) Inventors: Ning Yang, Dongguan (CN); Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/173,012

(22) Filed: Feb. 10, 2021

(65) Prior Publication Data

US 2021/0168752 A1    Jun. 3, 2021

Related U.S. Application Data

(63) Continuation of application No. PCT/CN2019/101140, filed on Aug. 16, 2019.

(60) Provisional application No. 62/720,751, filed on Aug. 21, 2018.

(51) Int. Cl.
*H04W 88/06* (2009.01)
*H04W 60/00* (2009.01)

(52) U.S. Cl.
CPC .......... *H04W 60/005* (2013.01); *H04W 88/06* (2013.01)

(58) Field of Classification Search
CPC ..................... H04W 60/005; H04W 88/06
See application file for complete search history.

(56) References Cited

U.S. PATENT DOCUMENTS

| | | | |
|---|---|---|---|
| 9,756,597 B1 * | 9/2017 | Park ........................ | H04W 8/08 |
| 2014/0315595 A1 | 10/2014 | Song et al. | |
| 2015/0103744 A1 | 4/2015 | Sun et al. | |
| 2016/0353330 A1 * | 12/2016 | Naik ................ | H04W 36/0022 |
| 2018/0041548 A1 | 2/2018 | Kalapatapu et al. | |
| 2018/0199302 A1 * | 7/2018 | Yi ........................ | H04W 76/34 |
| 2019/0098597 A1 * | 3/2019 | Basu Mallick ....... | H04W 76/15 |
| 2020/0153875 A1 * | 5/2020 | Karampatsis ....... | H04L 65/1016 |
| 2022/0070685 A1 * | 3/2022 | Morozumi ............ | H04W 88/06 |

FOREIGN PATENT DOCUMENTS

| | | |
|---|---|---|
| WO | WO2008/101421 A1 | 8/2008 |
| WO | WO2008/101431 A1 | 8/2008 |
| WO | WO2020/038300 A1 | 2/2020 |

OTHER PUBLICATIONS

Guangdong OPPO Mobile Telecommunications Corp., Ltd., International Search Report and Written Opinion, PCT/CN2019/101140, dated Nov. 18, 2019, 8 pgs.

(Continued)

*Primary Examiner* — Julio R Perez
(74) *Attorney, Agent, or Firm* — Morgan, Lewis & Bockius LLP

(57) ABSTRACT

A communication method comprises: starting, by a terminal device, a dual registration mode to register with both a first network and a second network; sending, by the terminal device, registration related information in the dual registration mode to a network device of at least one of the first network and the second network.

20 Claims, 4 Drawing Sheets

(56) References Cited

OTHER PUBLICATIONS

Qualcomm Incorporated, Media Tek Inc., TS 23.501: Clarifications on 5GC-EPC interworking, SA WG2 Temporary Document, SA WG2 Meeting #121, S2-173127, May 15-19, 2017, Hangzhou, P.R. China, 3 pgs.
Anonymous, 3GPP TS 23.501 V15.2.0 (Jun. 2018), 3rd Generation Partnership Project; Technical Specification Group Services and System Aspects; System Architecture for the 5G System; Stage 2 (Release 15), 217 pgs.
Guangdong OPPO Mobile Telecommunications Corp., Ltd., Extended European Search Report, EP19852305.2, dated Oct. 4, 2021, 12 pgs.
Lenovo et al., Supporting Dual Registration in Access Stratum, 3GPP TSG-RAN WG2 2018 NR Ad-Hoc Meeting#1, R2-18000691, Vancouver, Canada, Jan. 22-16, 2018, 3 pgs.
LG Electronics Inc., UE behaviors during Dual registration, 3GPP TSG-RAN2 Meeting #97Bis, R2-1702944, Spokane, WA, USA, Apr. 3-7, 2017, 3 pgs.

\* cited by examiner

COMMUNICATION METHOD, TERMINAL DEVICE AND MEDIUM

CROSS-REFERENCE TO RELATED APPLICATIONS

This application is a continuation application of PCT Application No. PCT/CN2019/101140, filed Aug. 16, 2019, and entitled "COMMUNICATION METHOD, TERMINAL DEVICE AND MEDIUM", which claims priority to U.S. Provisional Application Ser. No. 62/720,751, filed on Aug. 21, 2018 and entitled "A METHOD TO SUPPORT DUAL-REGISTRATION", all of which are incorporated herein by reference in their entirety

TECHNICAL FIELD

Embodiments of the present application relate generally to the field of communication, and, more particularly, to a communication method, a terminal device, and a computer-readable storage medium.

BACKGROUND

In NR (New Radio) system, it was agreed that UE (User Equipment) LTE (Long Term Evolution) capability, NR capability and LTE-NR capability in EN (E-UTRA NR)-DC (Dual Connectivity) case will be reported separately to the network.

However, when UE supports Dual Registration (DR) mode in which UE is registered with two different networks, the capability may be different for DR from single RAT (Radio Access Technology) case or DC case. For example, the capability for LTE only/NR only and the capability for LTE side and NR side in DR case could be different from each other. In DR case, like in EN-DC case, some capabilities could be shared between LTE and NR, e.g. antenna port, buffer, frequency layers, bands and band combinations. For example, four antenna ports could be used in LTE or NR when only one RAT is configured; while those antenna ports should be shared between LTE and NR.

However, comparing with EN-DC case, there may be no coordination between LTE and NR in DR mode; therefore, the capabilities between LTE and NR cannot be shared dynamically in DR mode.

SUMMARY

Embodiments of the present application provide a communication method, a terminal device and a computer-readable medium which enable notifying the network of registration related information in a dual registration mode.

In a first aspect of embodiments of the present application, there is provided a communication method, comprising:

starting, by a terminal device, a dual registration mode to register with both a first network and a second network;

sending, by the terminal device, registration related information in the dual registration mode to a network device of at least one of the first network and the second network.

In a second aspect of embodiments of the present application, there is provided a terminal device comprising:

a processing unit configured to start a dual registration mode to register with both a first network and a second network;

a transmitting unit configured to send registration related information in the dual registration mode to a network device of at least one of the first network and the second network according to instructions from the processing unit.

In a third aspect of embodiments of the present application, there is provided a terminal device comprising a processor and a transceiver, wherein the processor is configured to perform methods in the first aspect or possible implementations thereof based on the transceiver.

In a fourth aspect of embodiments of the present application, there is provided a computer-readable storage medium used for storing a computer program, wherein the computer program comprises instructions for performing methods in any one of the first aspect or possible implementations thereof.

In a fifth aspect of embodiments of the present application, there is provided a system on chip comprising a processor and a memory, wherein the memory stores a computer program, and the processor is configured to execute the computer program stored in the memory so as to implement methods in any one of the first aspect or possible implementations thereof when the computer program is executed.

Additional features, advantages, and embodiments of the application may be set forth or apparent from consideration of the following detailed description, drawings, and claims. Moreover, it is to be understood that both the foregoing summary and the following detailed description are exemplary and intended to provide further explanation without limiting the scope of the application claimed. The detailed description and the specific examples, however, indicate only exemplary embodiments of the application.

BRIEF DESCRIPTION OF THE DRAWINGS

Accompanying drawings used to describe embodiments or the prior art will be introduced briefly below in order to illustrate the technical methods of embodiments of the present application more clearly. Obviously, the accompanying drawings in the following description are merely for some embodiments of the present application, and other drawings can also be obtained based on these accompanying drawings by a person having ordinary skill in the art without creative efforts.

DETAILED DESCRIPTION

The technical methods in embodiments of the present application will be described in the following in combination with accompanying drawings of the embodiments of the present application.

In the case of the DR mode, there are some questions to be answered:

Q1: How does UE in single RAT, e.g. in LTE or NR, notify the network of that it registers or is going to register in DR mode, and DR related capabilities should be used?

Q2: How does UE in EN-DC mode indicate to the network that it registers or is going to register in DR mode, and DR related capabilities should be used?

Q3: How to report the DR capabilities to the network.

Embodiments of the present application provide a mechanism for communicating registration related information in the DR mode, for example, information for requesting for or notifying of registering in DR mode, and/or information about DR capabilities, so as to resolve at least one of the questions listed above, thereby enabling the terminal device to operate in the DR mode.

Embodiments of the present application can be applied in various kinds of communication systems which support the DR mode. The communication system may include two or more different networks, such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, a 5G system, a future evolved PLMN (Public Land Mobile Network), and so on.

Figure 1:
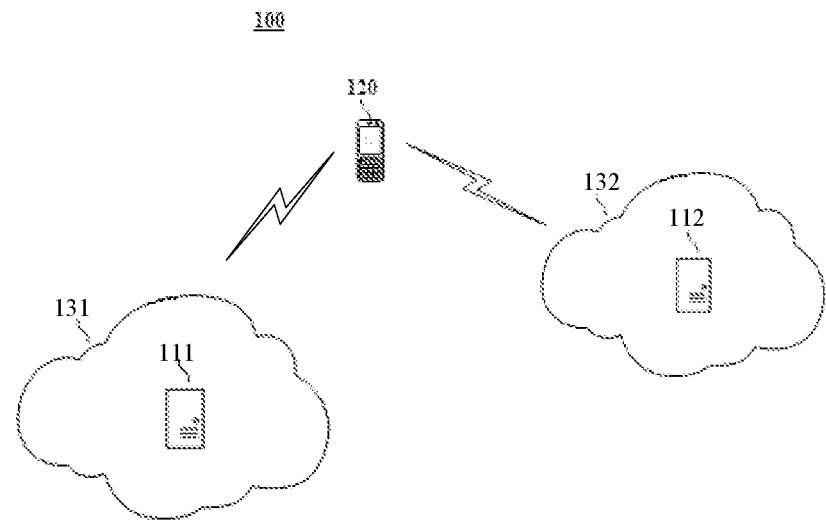
FIG. 1 is a diagram of a communication system 100 according to embodiments of the present application.

FIG. 1 illustrates a communication system 100 applied in embodiments of the present application. The communication system 100 may include two or more networks, such as a first network 131 and a second network 132 as shown in FIG. 1. The system 100 may further include one or more terminal devices such as a terminal device 120 as shown in FIG. 1, one or more network devices located in each of the two or more networks, such as a first network device 111 located in the first network 131 and a second network device 112 located in the second network 132 as shown in FIG. 1. The terminal device 120 can connect with or access any of the networks 131 and 132. For example, the terminal device 120 may operate in single RAT mode in the first network 131 or the second network 132 and register therewith, or may operate in DC mode in the first network 131 and the second network 132 and register with a master node which is one of the first and second network devices 111 or 112, or may operate in DR mode the first network 131 and the second network 132 and register with both the first and second network 131 and 132. The terminal device 120 may change the operating mode among the single RAT mode, the DC mode, and the DR mode. For example, the terminal device 120 may change from the single RAT mode or the DC mode to the DR mode, or vice versa.

The first and second networks 131 and 132 may be any two different networks. For example, the first network 131 is LTE, and the second network 132 is NR network, or vice versa. Each of the first and second network devices 111 and 112 may be any network device in the first or second network which may receive information from the terminal device 120 such as the registration related information so as to facilitate the DR operating mode of the terminal device 120. For example, the first or second network device 111 or 112 is a base station of the first or second network 131 or 132, or a core network device of the first or second network 131 or 132. For example, the core network device may be a function entity (such as AMF (Access and Mobility Management Function) or PCF (Policy Control Function)) of a core network in 5G system.

As examples, the terminal device 120 may be an access terminal, a UE (User Equipment), a user unit, a user station, a mobile radio station, a mobile station, a remote station, a remote terminal, a mobile device, a user terminal, a terminal, a wireless communication device, a user agent or a user device. An access terminal may be a cell phone, a cordless phone, an SIP (Session Initiation Protocol) phone, a WLL (Wireless Local Loop) station, a PDA (Personal Digital Assistant), a hand-held device with a wireless communication function, a computing device or other processing devices connected to a wireless modem, a vehicle-mounted device, a wearable device, a terminal device in a 5G network, a terminal device in a future evolved PLMN (Public Land Mobile Network), or the like. Optionally, a 5G system or network may also be called as a NR (New Radio) system or network.

It should be understood that the communication system 100 may further include other network entities such as a network controller, a mobility management entity, and the like. Embodiments of the present application do not have any limit on this.

It should be understood that the terms "system" and "network" herein are exchangeable. The term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

The term "to send/sending" in the present application means directly sending from one party to the other, or indirectly sending between the two, for example by means of forwarding by a third party. Likely, the term "to receive/receiving" in the present application means directly receiving from one party, or indirectly receiving from the party, for example by means of forwarding by a third party.

Figure 2:
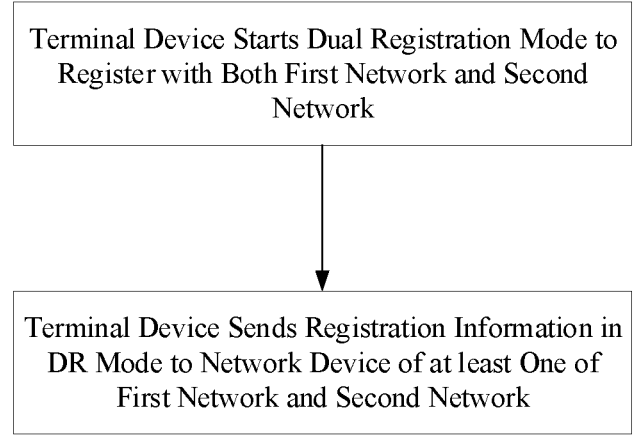
FIG. 2 is a flow chart of a communication method 200 according to an embodiment of the present application.

FIG. 2 is a flow chart of a communication method 200 according to an embodiment of the present application. The method 200 may be implemented in a communication system such as the communication system 100 as shown in FIG. 1. As shown in FIG. 2, the method 200 may include the following steps.

At S210, the terminal device starts a dual registration (DR) mode to register with both the first network and the second network.

As an example, the DR operating mode of the terminal device can be started in the terminal device by a user configuration. For example, there is an option of operating mode of the terminal device in the configuration menu of the terminal device, and if the user sets the operating mode to DR mode when configuring the terminal device, then the DR mode of the terminal device is started.

At S220, the terminal device sends registration related information in DR mode to a network device of at least one of the first network and the second network.

The term "registration related information in DR mode" in the present application means any information about registering or de-registering in DR mode which is communicated from the terminal device to the network, such as information for requesting for or notifying of registering in DR mode, and/or information about DR capabilities of the terminal device. As the terminal device switches from different operating mode to the DR mode, the step S220 of sending the registration related information includes different implementations.

It can be seen that, in the communication method according to embodiments of the present application, when a DR mode is started for a terminal device, registration related information in the dual registration mode is sent from the terminal device to the network side with which the terminal device is registered in the DR mode, so that the network side can obtain information necessary for operating in the DR mode.

Figure 3:
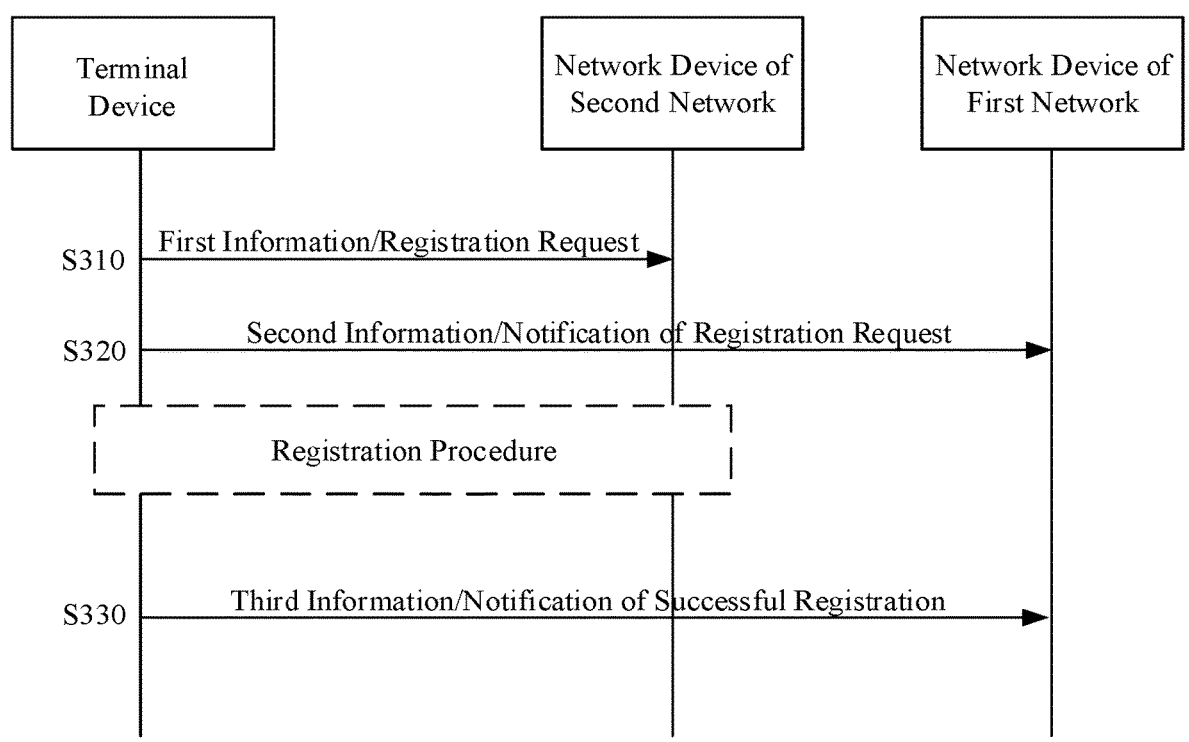
FIG. 3 is a flow chart of an exemplary implementation of step S220 in FIG. 2 according to an embodiment of the present application.

FIG. 3 is a flow chart of an exemplary implementation of step S220 in FIG. 2 according to an embodiment of the present application. In the embodiment as shown in FIG. 3, the terminal device has registered with the first network and not registered with the second network when starting the dual registration mode. For example, the terminal device operates in single RAT mode (e.g., LTE only mode, or NR only mode) and registers with only one network (e.g., LET or NR) when starting the DR mode. As shown in FIG. 3, the exemplary procedure of communicating registration related information between the terminal device and the network device of the first and/or second network may include steps as below.

At S310, the terminal device sends first information to a network device of the second network, wherein the first information is a request for registering with the second network in the dual registration mode.

As described in the above, the terminal device started the DR mode at S210. The staring of the DR mode requires that the terminal device register with both the first network which has been registered with and the second network which has not been registered with. Thus, at S310, the terminal device sends a request for registering with the second network in the dual registration mode to the network device of the second network so as to also register with the second network. Then, a procedure of registration with the second network in DR mode is started, which may be same or similar with a normal registration procedure and detailed description of which is omitted so as not to obscure the present application.

At S320, the terminal device sends second information to a network device of the first network, wherein the second information indicates that the terminal device is requesting for registering with the second network.

It should be understood that S320 is an optional step. That is, the terminal device may or may not notify the network device of the first network of that the terminal device is requesting for registering with the second network (S310). Although FIG. 3 shows S320 after S310, this does not mean the order of performing S310 and S320. In an embodiment, S320 can be performed concurrently with S310. Alternatively, S320 can be performed after S310 and before the terminal device successfully registers with the second network.

At S330, the terminal device sends third information to the network device of the first network after successfully registering with the second network in the dual registration mode, wherein the third information indicates that the terminal device has registered with the second network in the dual registration mode.

After successfully registering with the second network (e.g., after the registration procedure is completed), the terminal device notifies the first network of the successful registration at S330. As such, both the first and the second networks know that the terminal device has been registered with the two networks in DR mode.

By communicating the first and the third information as mentioned in the above (or the first, the second and the third information), question Q1 can be resolved.

Figure 4:
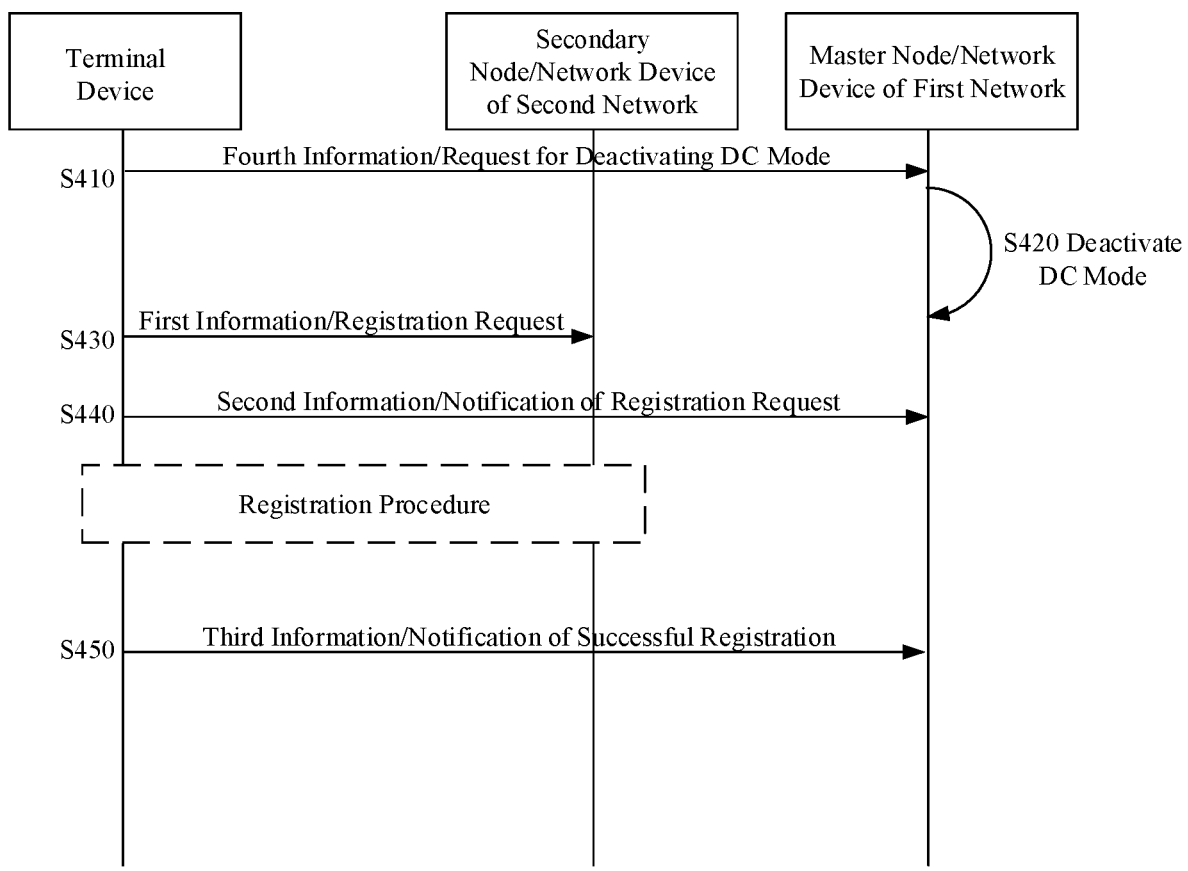
FIG. 4 is a flow chart of another exemplary implementation of step S220 in FIG. 2 according to another embodiment of the present application.

FIG. 4 is a flow chart of another exemplary implementation of step S220 in FIG. 2 according to another embodiment of the present application. In the embodiment as shown in FIG. 4, the terminal device is in a Dual Connectivity (DC) mode, wherein a master node is in the first network and a secondary node is in the second network when starting the dual registration mode. For example, the terminal device operates with connections with both the LTE network and the NR network, and the master node is in the LTE network, which means that the terminal device registers only with the LTE network but not with the NR network. As shown in FIG. 4, the exemplary procedure of communicating registration related information between the terminal device and the network device of the first and/or second network may include steps as below.

At S410, the terminal device sends fourth information to the master node of the Dual Connectivity mode, wherein the fourth information is a request for registering in the dual registration mode with the first and second networks.

In DC mode, when the terminal device decides to change to the DR mode, the terminal device needs to send a request for operating in DR mode (i.e. the request for registering in DR mode as mentioned above) to the master node.

At S420, the master node deactivates the DC mode.

The master node may approve or reject the request of the terminal device. If the master node approves the request, S420 is performed. Alternatively, if the master node rejects the request, S420 will be not performed and the procedure of the dual registration ends. In the embodiment of FIG. 4, the master node approves the request, and after S420, S430 is performed to continue the procedure of the dual registration. Only after the dual connectivity is deactivated, the dual registration can be performed. In the DC mode, the terminal device registers with only the network in which the master node is located. After the dual connectivity is deactivated, the registration is not removed, that is, the terminal device is still registering with the network which is the first network in the case of FIG. 4. Thus, the terminal device also needs to register with another network, i.e. the second network, so as to implement the DR mode.

At S430, the terminal device sends the first information to the network device of the second network, wherein the first information is a request for registering with the second network in the dual registration mode.

After the mater node deactivates the DC mode at S420, the terminal device starts the procedure of DR with sending a registration request to the second network which has not been registered with. Here, the first information is the same at S310.

At S440, the terminal device sends the second information to a network device of the first network, wherein the second information indicates that the terminal device is requesting for registering with the second network.

S440 is similar to S320, and detailed description thereof is omitted here for the sake of brevity.

At S450, the terminal device sends the third information to the network device of the first network after successfully registering with the second network in the dual registration mode, wherein the third information indicates that the terminal device has registered with the second network in the dual registration mode.

S450 is similar to S330, and detailed description thereof is omitted here for the sake of brevity.

In FIG. 4, it is shown for brevity that the master node is also the network device of the first network and the secondary node is also the network device of the second network. It should be understood that the master node and the network device of the first network may be different devices of the first network, and the secondary node and the network device of the second network may be different devices of the second network.

By communicating the fourth, the first and the third information as mentioned in the above (or the fourth, the first, the second and the third information), question Q2 can be resolved.

Besides the first to fourth information, the terminal device may also communicate its DR capabilities to the first and/or second networks, as mentioned in question Q3. Thus, the registration related information also includes fifth information indicating dual registration capabilities of the terminal device for the second network and sixth information indicating dual registration capabilities of the terminal device for the first network, and the terminal device also sends the fifth and the sixth information to the network device(s) of the first and the second networks.

The terminal device may send information about its DR capabilities (e.g. the fifth and the sixth information) to the networks at any appropriate time, for example, when the terminal device decides to operate in DR mode, or may report the DR capabilities together with the terminal device's normal capabilities. For example, the terminal device may report DR capabilities to a corresponding network when the network retrieves UE's capabilities during the initial registration of the terminal device in a single RAT mode. However, since the DR mode may not be allowed by the network, or may not be triggered by the terminal device, reporting DR capabilities during the initial registration in a single RAT mode may cause unnecessary waste in processing and/or bandwidth of the network. In another example, the terminal device may keep the DR capabilities and report when needed, for example, after the terminal device starts the DR mode. For example, for a network which has not been registered with in DR mode when starting the DR mode, the terminal device may report DR capabilities for the network during registration with the network, and for a network which has been registered with when starting the DR mode, the terminal device may report DR capabilities for the network when the network enquires the DR capabilities.

In the embodiments of FIGS. 3 and 4 in which the terminal device has registered with the first network and not registered with the second network when starting the dual registration mode, the terminal device may send the fifth information to the network device of the second network when reporting normal User Equipment capability information during registration with the second network in the DR mode and send the sixth information to the network device of the first network when enquired by the first network about the dual registration capabilities of the terminal device for the first network. For example, the terminal device may send the fifth information in a User Equipment capability transfer message of a normal registration procedure, and the sixth information in a User Equipment capability update message.

By communicating the fifth and the sixth information as mentioned above, question Q3 can be resolved.

When operating in the DR mode, the terminal device may de-register from any of the two networks. Thus, the registration related information may include seventh information indicating that the terminal device has de-registered with one of the first and the second networks. After the terminal device de-registered with one of the first and the second networks, for example, the first network, the terminal device will send the seventh information to the network device of the other network (i.e. the second network), so as to notify the other network of that the terminal device has de-registered with the first network from the DR mode. In another example, the seventh information may also include information about the network which is still registered with, such as ID of a cell, ID of a core network device, or the like.

As mentioned in the above, the network device of the first or the second network may be a base station or a core network device. If the network device is a base station, the registration related information which may include at least one of the first to the seventh information can be sent in a radio resource control signaling. If the network device is a core network device, the registration related information which may include at least one of the first to the seventh information can be sent in a non-access stratum signaling.

Figure 5:
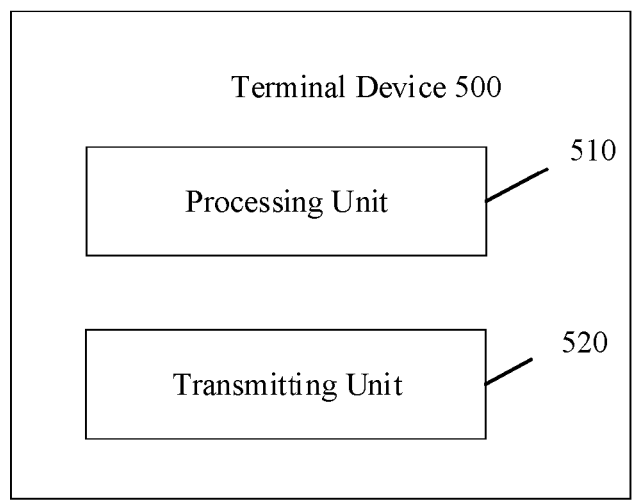
FIG. 5 is a schematic block diagram of a terminal device 500 according to an embodiment of the present application.

FIG. 5 is a schematic block diagram of a terminal device 500 according to an embodiment of the present application. As shown in FIG. 5, the terminal device 500 includes:

a processing unit 510 configured to start a dual registration mode to register with both a first network and a second network;

a transmitting unit 520 configured to send registration related information in the dual registration mode to a network device of at least one of the first network and the second network according to instructions from the processing unit.

In one example in which the terminal device has registered with the first network and not registered with the second network when starting the dual registration mode, the registration related information comprises at least one of first information, second information and third information, and wherein the transmitting unit 520 is configured to perform at least one of operations as below according to instructions from the processing unit 510:

sending the first information to a network device of the second network, wherein the first information is a request for registering with the second network in the dual registration mode;

sending the second information to a network device of the first network, wherein the second information indicates that the terminal device is requesting for registering with the second network; and sending the third information to the network device of the first network after successfully registering with the second network in the dual registration mode, wherein the third information indicates that the terminal device has registered with the second network in the dual registration mode.

In one example in which the terminal device is in a Dual Connectivity mode and wherein a master node is in the first network and a secondary node is in the second network when starting the dual registration mode, the registration related information further comprises fourth information, wherein the transmitting unit 520 is further configured to perform a processing as below according to instructions from the processing unit 510:

sending the fourth information to the master node of the Dual Connectivity mode, wherein the fourth information is a request for registering in the dual registration mode with the first and second networks, and wherein the transmitting unit 520 is configured to send the first information to the network device of the second network after the Dual Connectivity mode is deactivated by the master node in response to the fourth information.

In one example, the registration related information further comprises at least one of fifth information and sixth information, and the transmitting unit 520 is configured to perform at least one of operations as below according to instructions from the processing unit 510:
sending the fifth information indicating dual registration capabilities of the terminal device for the second network to a network device of the second network; and
sending the sixth information indicating dual registration capabilities of the terminal device for the first network to a network device of the first network.

In one example in which the terminal device has registered with the first network and not registered with the second network when starting the dual registration mode, the transmitting unit 520 is configured to perform at least one of operations as below according to instructions from the processing unit 510:
sending the fifth information to the network device of the second network when reporting normal User Equipment capability information; and
sending the sixth information to the network device of the first network when enquired by the first network about the dual registration capabilities of the terminal device for the first network.

In one example, the registration related information comprises seventh information indicating that the terminal device has de-registered with one of the first and the second networks, and the transmitting unit 520 is configured to:
send the seventh information to a network device of the other of the first and the second networks in a case that the terminal device has de-registered with the one of the first and the second networks from the dual registration mode.

In one example, the transmitting unit 520 is configured to send the registration related information in a radio resource control signaling or in a non-access stratum signaling to the network device.

In one example, the transmitting unit 520 is configured to: send the fifth or the sixth information in a User Equipment capability transfer message or a User Equipment capability update message.

In one example, the first network is LTE network and the second network is NR network of the $5^{th}$ generation mobile communication system; or the second network is LTE network and the first network is NR network of the $5^{th}$ generation mobile communication system.

It should be understood that the terminal device 500 can be corresponding to that terminal device in embodiments of the method 200 and can implement corresponding functions of that terminal device, which are omitted herein for the sake of brevity.

Figure 6:
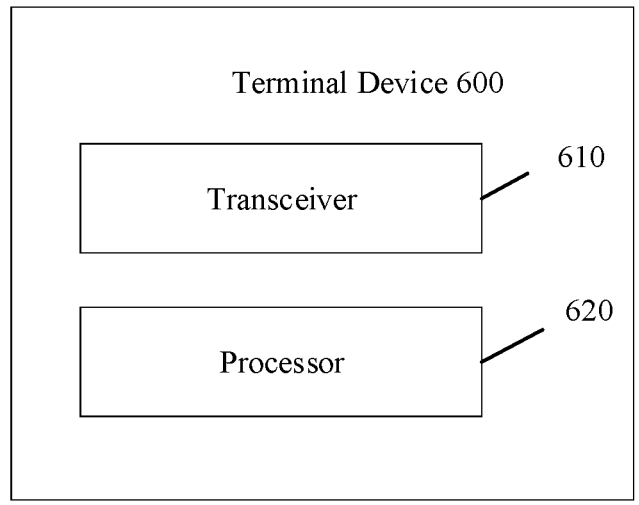
FIG. 6 is a schematic block diagram of a terminal device 600 according to another embodiment of the present application.

FIG. 6 is a schematic block diagram of a terminal device 600 according to another embodiment of the present application. As shown in FIG. 6, the terminal device 600 includes:
a transceiver 610 and a processor 620, wherein the processor 620 is configured to perform any one of embodiments of the communication method 200 based on the transceiver 610.

It should be understood that the terminal device 600 can be corresponding to that terminal device in embodiments of the method 200 and can implement corresponding functions of that terminal device, which are omitted herein for the sake of brevity.

Figure 7:
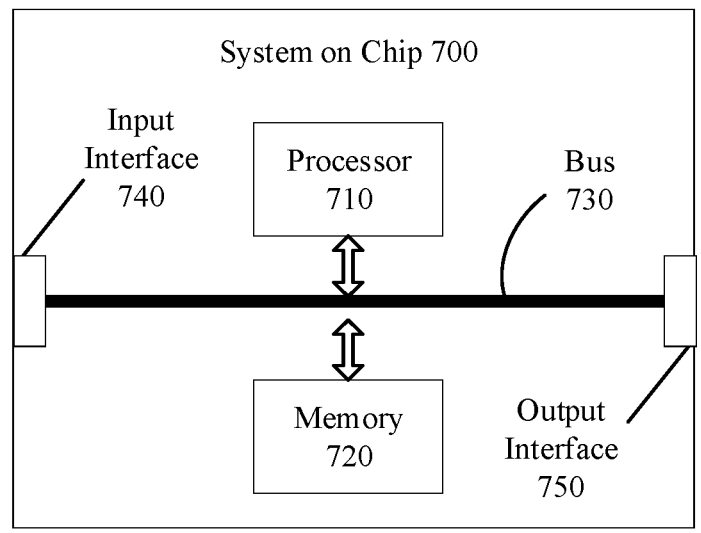
FIG. 7 is a schematic structure diagram of a system on chip (SoC) 700 according to an embodiment of the present application.

FIG. 7 is a schematic structure diagram of a system on chip (SoC) 700 according to an embodiment of the present application. The Soc 700 includes a processor 710 and a memory 720, wherein the processor 710 and the memory 720 are connected via a bus 730, and the processor 710 is configured to execute a code in the memory 720. In an example, the Soc 700 may further include an input interface 740 and an output interface 750, as shown in FIG. 7.

In one example, when the code is executed, the processor 710 implements any one of embodiments of the communication method 200 in method embodiments implemented by a terminal device, which are omitted herein for the sake of brevity.

It may be appreciated by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical methods. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the methods of the embodiments of the present application.

In addition, all functional units in the embodiments of the present application may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical method of the present application in essence, or the part that contributes to the prior art, or all or part of the technical method, may be embodied in the form of a software product. The computer software product is stored in a storage medium and includes a plurality of instructions for a computer device (which may be a personal computer, a server, a network device or the like) to execute all or part of the steps of the method described in the embodiments of the present application. Thus, embodiments of the present application also provide a computer-readable medium used for storing a computer program, wherein the computer program comprises instructions for performing any of embodiments of the communication method (e.g. the method 200) as described in the above. In an embodiment, the computer-readable medium is a non-transitory storage medium which can be read by a computer.

The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A communication method, comprising:
   starting, by a terminal device, a dual registration mode to register with both a first network and a second network; and
   sending, by the terminal device, registration related information in the dual registration mode to a network device of at least one of the first network and the second network, wherein in a case that the terminal device has registered with the first network and not registered with the second network when starting the dual registration mode, the sending, by the terminal device, registration related information in the dual registration mode to a network device of at least one of the first network and the second network comprises at least one of:
   sending, by the terminal device, first information to a network device of the second network, wherein the first information is a request for registering with the second network in the dual registration mode;
   sending, by the terminal device, second information to a network device of the first network, wherein the second information indicates that the terminal device is requesting for registering with the second network; and
   sending, by the terminal device, third information to the network device of the first network after successfully registering with the second network in the dual registration mode, wherein the third information indicates that the terminal device has registered with the second network in the dual registration mode;
   wherein in a case that the terminal device is in a Dual Connectivity mode and wherein a master node is in the first network and a secondary node is in the second network when starting the dual registration mode, the sending, by the terminal device, registration related information in the dual registration mode to a network device of at least one of the first network and the second network further comprises:
   sending, by the terminal device, fourth information to the master node of the Dual Connectivity mode, wherein the fourth information is a request for registering in the dual registration mode with the first and second networks;
   wherein the sending, by the terminal device, first information to a network device of the second network comprises:
   sending, by the terminal device, the first information to the network device of the second network after the Dual Connectivity mode is deactivated by the master node in response to the fourth information.

2. The method of claim 1, wherein the sending, by the terminal device, registration related information in the dual registration mode to a network device of at least one of the first network and the second network comprises at least one of:
   sending, by the terminal device, fifth information indicating dual registration capabilities of the terminal device for the second network to a network device of the second network; and
   sending, by the terminal device, sixth information indicating dual registration capabilities of the terminal device for the first network to a network device of the first network.

3. The method of claim 2, wherein in a case that the terminal device has registered with the first network and not registered with the second network when starting the dual registration mode;
   the sending, by the terminal device, fifth information indicating dual registration capabilities of the terminal device for the second network to a network device of the second network comprises:
   sending, by the terminal device, the fifth information to the network device of the second network when reporting normal User Equipment capability information; and
   the sending, by the terminal device, sixth information indicating dual registration capabilities of the terminal device for the first network to a network device of the first network comprises:
   sending, by the terminal device, the sixth information to the network device of the first network when enquired by the first network about the dual registration capabilities of the terminal device for the first network.

4. The method of claim 2, wherein the fifth and the sixth information are sent in a User Equipment capability transfer message or a User Equipment capability update message.

5. The method of claim 1, wherein the sending, by the terminal device, registration related information in the dual registration mode to a network device of at least one of the first network and the second network comprises:
   sending, by the terminal device, seventh information indicating that the terminal device has de-registered with one of the first and the second networks to a network device of the other of the first and the second networks in a case that the terminal device has de-registered with the one of the first and the second networks from the dual registration mode.

6. The method of claim 1, wherein the sending, by the terminal device, registration related information in the dual registration mode to a network device of at least one of the first network and the second network comprises:
   sending, by the terminal device, the registration related information in a radio resource control signaling or in a non-access stratum signaling to the network device.

7. The method of claim 1, wherein the first network is LTE network and the second network is NR network of the $5^{th}$ generation mobile communication system; or the second network is LTE network and the first network is NR network of the $5^{th}$ generation mobile communication system.

8. A terminal device, comprising:
   a processor;
   a memory; and
   a transceiver, wherein the memory stores a computer program, and the processor is configured to execute the computer program stored in the memory to:
  start a dual registration mode to register with both a first network and a second network; and
  send registration related information in the dual registration mode to a network device of at least one of the first network and the second network via the transceiver, wherein in a case that the terminal device has registered with the first network and not registered with the second network when starting the dual registration mode, the registration related information comprises at least one of first information, second information and third information, and wherein the processor is further configured to perform at least one of:
sending the first information to a network device of the second network via the transceiver, wherein the first information is a request for registering with the second network in the dual registration mode;
sending the second information to a network device of the first network via the transceiver, wherein the second information indicates that the terminal device is requesting for registering with the second network; and
sending the third information to the network device of the first network via the transceiver after successfully registering with the second network in the dual registration mode, wherein the third information indicates that the terminal device has registered with the second network in the dual registration mode;
wherein in a case that the terminal device is in a Dual Connectivity mode and wherein a master node is in the first network and a secondary node is in the second network when starting the dual registration mode, the registration related information further comprises fourth information, wherein the processor is further configured to:
  send the fourth information to the master node of the Dual Connectivity mode via the transceiver, wherein the fourth information is a request for registering in the dual registration mode with the first and second networks; and
  send the first information to the network device of the second network via the transceiver after the Dual Connectivity mode is deactivated by the master node in response to the fourth information.

9. The terminal device of claim 8, wherein the registration related information further comprises at least one of fifth information and sixth information, and the processor is further configured to perform at least one of:
  sending the fifth information indicating dual registration capabilities of the terminal device for the second network to a network device of the second network via the transceiver; and
  sending the sixth information indicating dual registration capabilities of the terminal device for the first network to a network device of the first network via the transceiver.

10. The terminal device of claim 9, wherein in a case that the terminal device has registered with the first network and not registered with the second network when starting the dual registration mode, the processor is further configured to:
  send the fifth information to the network device of the second network via the transceiver when reporting normal User Equipment capability information; and
  send the sixth information to the network device of the first network via the transceiver when enquired by the first network about the dual registration capabilities of the terminal device for the first network.

11. The terminal device of claim 9, wherein the processor is further configured to:
  send the fifth or the sixth information in a User Equipment capability transfer message or a User Equipment capability update message via the transceiver.

12. The terminal device of claim 8, wherein the registration related information comprises seventh information indicating that the terminal device has de-registered with one of the first and the second networks, and the processor is further configured to:
  send the seventh information to a network device of the other of the first and the second networks via the transceiver in a case that the terminal device has de-registered with the one of the first and the second networks from the dual registration mode.

13. The terminal device of claim 8, wherein the processor is further configured to send the registration related information in a radio resource control signaling or in a non-access stratum signaling to the network device via the transceiver.

14. The terminal device of claim 8, wherein the first network is LTE network and the second network is NR network of the 5th generation mobile communication system; or the second network is LTE network and the first network is NR network of the 5th generation mobile communication system.

15. A network device, comprising:
  a processor;
  a memory; and
  a transceiver,
  wherein the memory stores a computer program, and the processor is configured to execute the computer program stored in the memory to:
  receive, via the transceiver, registration related information in a dual registration mode sent by a terminal device after the terminal device starts the dual registration mode, wherein, in the dual registration mode, the terminal device is registered with both a first network and a second network, the network device being used for the second network;
  in a case that the terminal device has registered with the first network and not registered with the second network when starting the dual registration mode, receive, via the transceiver, first information sent by the terminal device, wherein the first information is a request for registering with the second network in the dual registration mode; and
  wherein in a case that the terminal device is in a Dual Connectivity mode and wherein a master node is in the first network and a secondary node is in the second network when starting the dual registration mode, the terminal device sends fourth information to the master node of the Dual Connectivity mode, wherein the fourth information is a request for registering in the dual registration mode with the first and second networks, wherein the processor is further configured to: receive, via the transceiver, the first information sent by the terminal device after the Dual Connectivity mode is deactivated by the master node in response to the fourth information.

16. The network device of claim 15, wherein the processor is further configured to receive, via the transceiver, fifth information indicating dual registration capabilities of the terminal device for the second network.

17. The network device of claim 16, wherein the processor is further configured to: in a case that the terminal device has registered with the first network and not registered with the second network when starting the dual registration mode, receive, via the transceiver, the fifth information sent by the terminal device when reporting normal User Equipment capability information.

18. The network device of claim 16, wherein the fifth information is sent in a User Equipment capability transfer message or a User Equipment capability update message.

19. The network device of claim 15, wherein the processor is further configured to: receive, via the transceiver, seventh information indicating that the terminal device has de-registered with the first network, in a case that the terminal device has de-registered with the first network from the dual registration mode.

20. The network device of claim 15, wherein the processor is further configured to: receive, via the transceiver, the registration related information sent by the terminal device in a radio resource control signaling or in a non-access stratum signaling.

\* \* \* \* \*